United States Patent [19]

Levine

[11] Patent Number: 4,594,612

[45] Date of Patent: Jun. 10, 1986

[54] TRANSFER SMEAR REDUCTION IN LINE TRANSFER CCD IMAGERS

[75] Inventor: Peter A. Levine, Mercer County, N.J.

[73] Assignee: RCA Corporation, Princeton, N.J.

[21] Appl. No.: 690,249

[22] Filed: Jan. 10, 1985

[51] Int. Cl.⁴ .............................................. H01N 3/15
[52] U.S. Cl. ...................................... 358/213; 358/163
[58] Field of Search ............... 358/213, 212, 209, 211, 358/44, 48, 160, 163, 172, 167; 357/24 LB; 250/578

[56] References Cited

U.S. PATENT DOCUMENTS 4,237,383 12/1980 Kosonocky et al. ................ 250/578
4,293,877 10/1981 Tsunekawa et al. ................ 358/213
4,314,275 2/1982 Chapman ............................ 358/113
4,387,402 6/1983 Lewis ................................... 358/213
4,423,437 12/1983 Beck et al. .......................... 358/113
4,510,528 4/1985 Bergen ................................ 358/213

Primary Examiner—Gene Z. Rubinson
Assistant Examiner—Robert G. Lev
Attorney, Agent, or Firm—Joseph S. Tripoli; George E. Haas; Allen L. Limberg

[57] ABSTRACT

Apparatus for deriving samples of transfer smear from a CCD imager of line transfer type and differentially combining them with video samples contaminated with transfer smear supplied from the same CCD imager, thereby to generate video signal samples in which transfer smear is suppressed.

6 Claims, 8 Drawing Figures

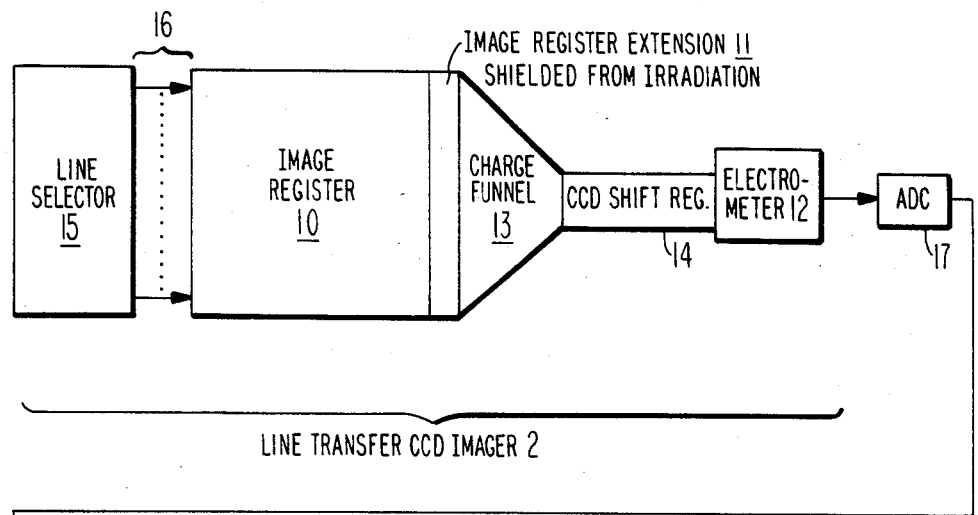
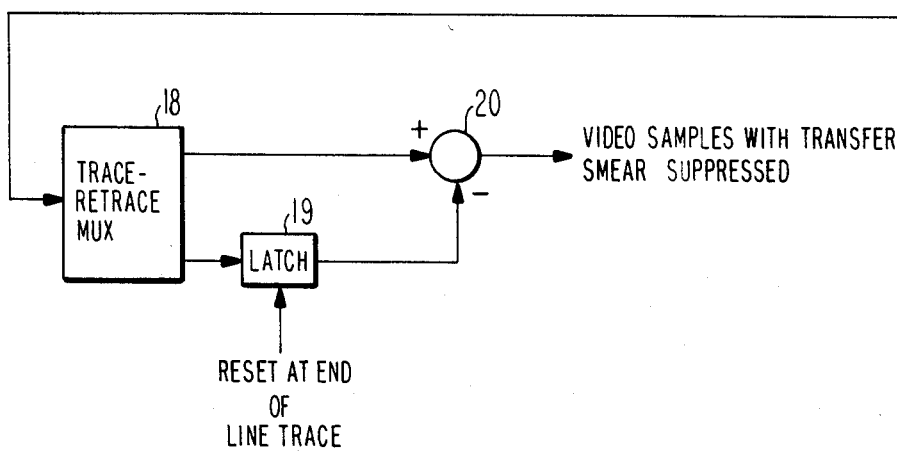
Fig. 1
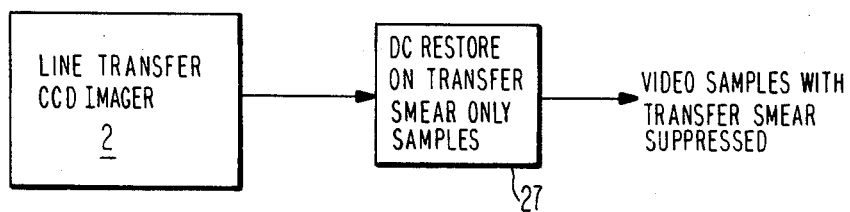
Fig. 4

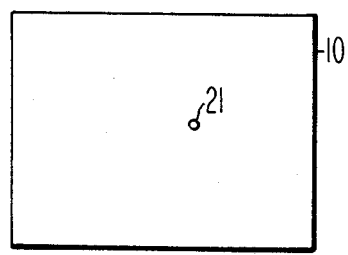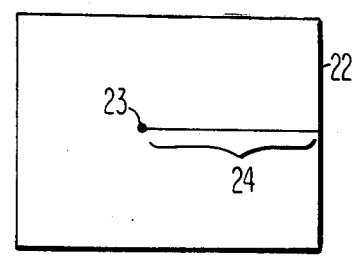
Fig. 2 (a) CHARGE PATTERN IN IMAGE REGISTER 10   (b) TV SCREEN DISPLAY
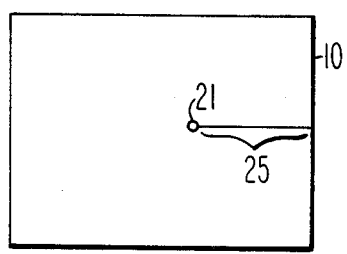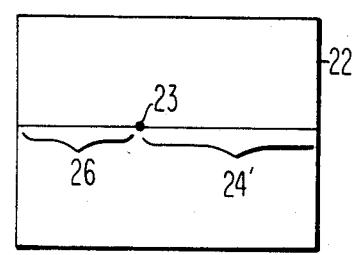
Fig. 3 (a) CHARGE PATTERN IN IMAGE REGISTER 10   (b) TV SCREEN DISPLAY
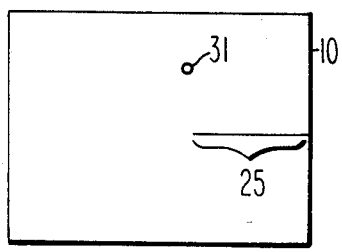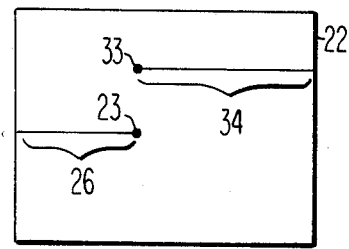
Fig. 6 (a) CHARGE PATTERN IN IMAGE REGISTER 10   (b) TV SCREEN DISPLAY
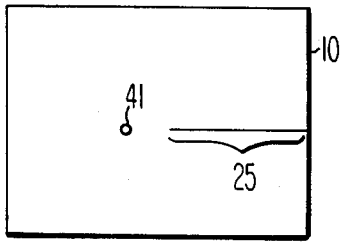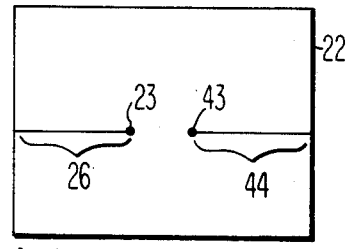
Fig. 7 (a) CHARGE PATTERN IN IMAGE REGISTER 10   (b) TV SCREEN DISPLAY

TRANSFER SMEAR REDUCTION IN LINE TRANSFER CCD IMAGERS

The present disclosure concerns reducing transfer smear in charge-coupled-device (CCD) imagers of the line transfer type.

BACKGROUND OF THE INVENTION

CCD imagers of the line-transfer type have an image register comprising a plurality of equal-length charge transfer channels in a parallel array into which a radiant energy image is projected. Elements of this image are photoconverted to charge packets accumulating in the charge transfer stages of the ones of these charge transfer channels receiving static clocking signals. During the picture, or active portions of the field trace interval successive ones, successive alternate ones, or successive pairs of the charge transfer channels are selected at line scan rate to receive dynamic clocking signals for at least the line trace portions of the following line interval. Responsive to this dynamic clocking each selected charge transfer channel transfers the charge packets accumulated therein into a CCD line multiplexer and thence to a charge sensing stage to generate a line of video signal samples. The line multiplexer may be a side-loaded CCD shift register, by way of example; or, by way of further example, it may be a charge funnel, a CCD shift register with wide enough input port to span the parallelly aligned output ports of the charge transfer channels in the image register and with a relatively narrow output port to the charge sensing stage.

Transfer smear arises in a semiconductor imager when there is transfer of charge packets past areas of intense radiant energy in the image. Transfer smear has been a problem in CCD imagers of field transfer type, which has been avoided by shuttering these imagers to interrupt image register irradiation during field transfer. Shuttering a CCD imager of line transfer type is impractical to do, as can be readily appreciated by one skilled in optical system design. In the present inventor's previous work, transfer smear in video signals supplied from unshuttered field transfer CCD imagers has been suppressed. In general this is done using an electrical technique wherein a black level signal that is contaminated with transfer smear is differentially combined with the video signal contaminated with transfer smear.

In making provisions for electrically compensating for transfer smear one becomes aware that the problem can be subclassified according to whether the image does or does not change from field to field. Field to field change of all image element occurs, for example, during the panning of a television camera. Panning and many types of image movement across screen involve relative movement of imager and image in predetermined horizontal direction. Transfer smear artifacts have a tendency to be more disturbing to the viewer of a reconstructed television image from a CCD imager output signal when these artifacts appear in a direction perpendicular to motion rather than in the direction of motion. Transfer smear artifacts appear as vertical streaking in a field transfer type of CCD imager, but as horizontal streaking in a line transfer type of CCD imager.

The severity of transfer smear in a CCD imager is related to the time it takes to move a charge packet past an area of intense radiant energy in the image. The speed with which charge can be moved in a CCD device for a given amount of drive power is limited by the RC time constant associated with the resistance of the clock signal source and the capacitance of the gate electrodes being driven respective to elements at static potential. In a field transfer type of CCD imager, where all the charge tranfer channels in the image and field storage registers are simultaneously forward clocked during field transfer, field transfer times typically are of the order of ten scan line times, each scan line time comprising a line trace and a line retrace interval. In a line transfer type of CCD imager forward clocking of a selected charge transfer channel usually takes place in one line trace interval, and the number of charge packets transferred in one line time is two to three times the number of charge packets (i.e., one per field line) transferred during field transfer in a field transfer CCD imager. So transfer smear is one-tenth to one-thirtieth so severe in an unshuttered CCD imager of line transfer type as it is in an unshuttered CCD imager of field transfer type, but transfer smear is nevertheless a significant problem.

SUMMARY OF THE INVENTION

The invention is embodied in the combination of a CCD imager of line transfer type, arranged to supply samples of transfer smear alone as well as samples of video signal contaminated with transfer smear, and apparatus that differentially combines those samples to generate samples of video signal with transfer smear suppressed in them.

BRIEF DESCRIPTION OF THE DRAWING

FIG. 1 is a block diagram of a line transfer CCD imager in combination with apparatus for suppressing transfer smear, which combination embodies the invention.

FIGS. 2 and 3 are diagrams, the (a) portions of which indicate charge patterns in the image register of a line transfer CCD imager, which charge patterns are associated with transfer smear generation when images are stationary from field to field, and the (b) portions of which depict television image response to these charge patterns.

Figure 5:
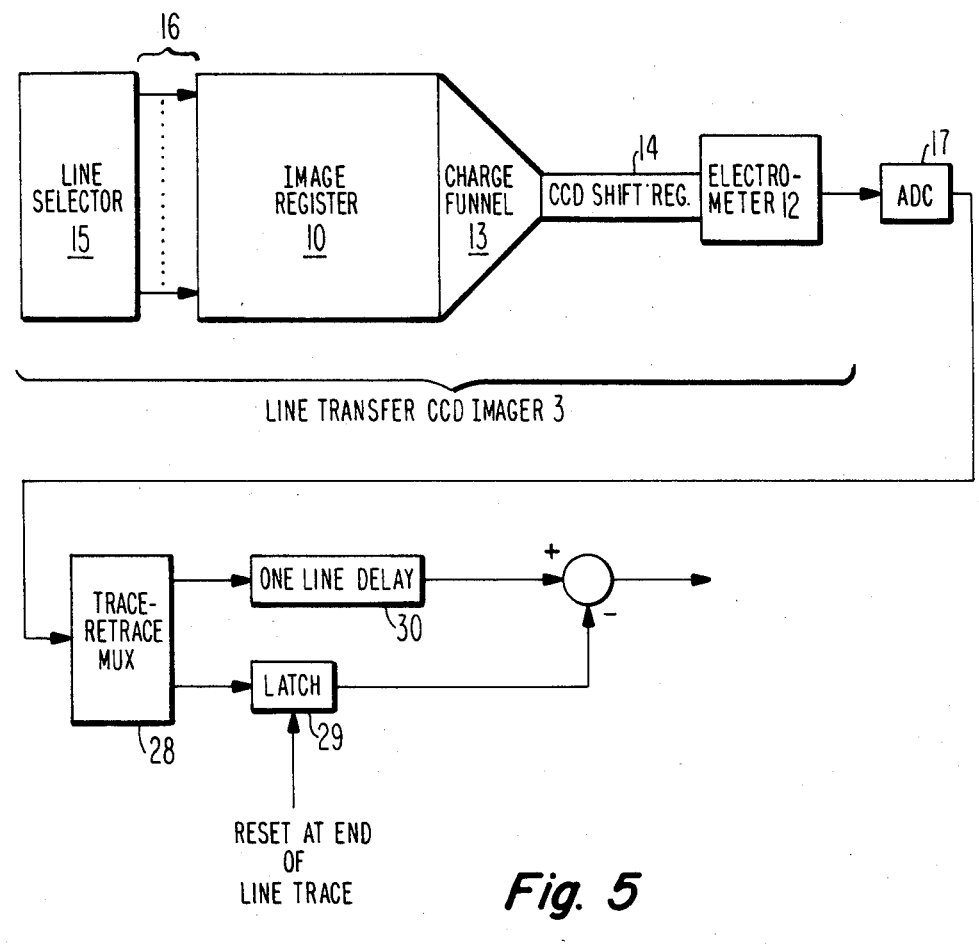

Each of FIGS. 4 and 5 is a block diagram of a line transfer CCD imager in combination with apparatus for suppressing transfer smear, which combination embodies the invention.

FIGS. 6 and 7 are diagrams, the (a) portions of which indicate charge patterns in the image register of a line transfer CCD imager, which charge patterns are associated with smear generation when images change from field to field, and the (b) portions of which depict television image response to these charge patterns.

Figure 8:
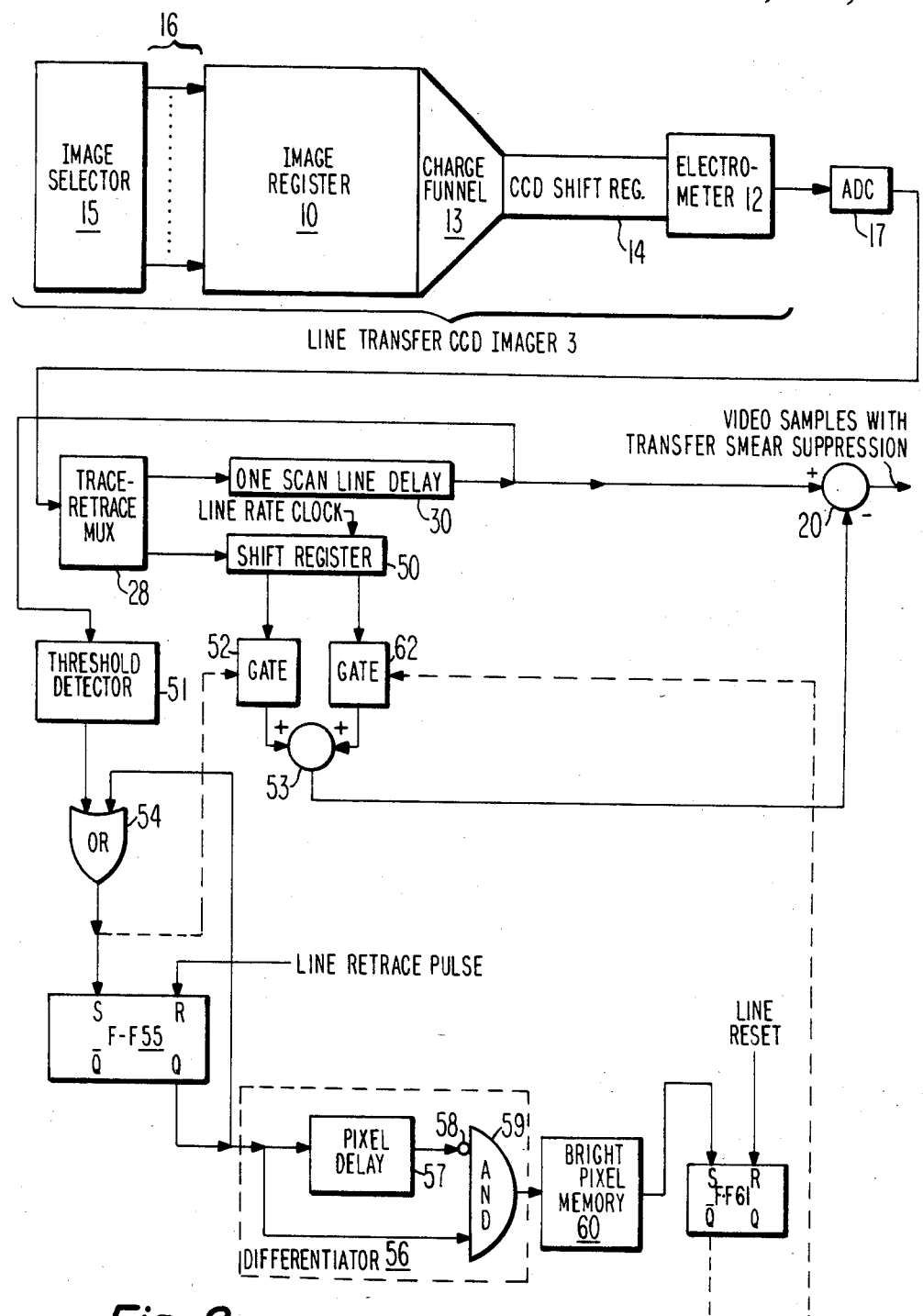

FIG. 8 is a block diagram of a line transfer CCD imager in combination with apparatus for suppressing transfer smear despite field to field changes in image, such as occur during the panning process, which combination embodies the invention.

The drawing assumes the CCD imagers to be back-illuminated types constructed on thinned semiconductor substrates, which is presently preferred practice, and the imagers are presented as if viewed from their back so that the correlation between charge packet locations in their image registers and transfer smear artifacts on a conventional televison screen involves a perversion. Non-inverting optics are presumed to be used with the CCD imager, so the top of the images in image register and on television display screen are both towards top of figure.

DETAILED DESCRIPTION

In FIG. 1 line transfer CCD imager 2 is shown as having an image register 10, which is irradiated by a radiant energy image, and an image register extension 11, which is shielded from irradiation. More specifically image register 10 and its extension 11 together comprise a parallel array of charge transfer channels, which are not explicitly shown in FIG. 1, but would extend left to right across imager 10 and its extension 11. The parallelly aligned output parts of these charge transfer channels selectively supply charge packets to an electrometer 12 or other charge sensing output stage through a charge multiplexer. The charge multiplexer can take a variety of forms, but is shown in FIG. 1 as comprising the cascade connection of a charge funnel 13 followed by a CCD shift register 14.

A line selector 15 selectively forward clocks the charge transfer channels of image register 10 and its extension 11. Charge packets are accumulated in the portions of these charge transfer channels in image register 10. The accumulation is the result of collecting, in the potential energy wells induced in the charge transfer channels, the charge carriers generated by photoconversion of elements of the radiant energy image projected into image register 10. Line selector 15 successively applies dynamic clocking signals via connections 16 to image register 10. This causes read-out of successive ones of, successive alternate ones of, or successive pairs of the charge transfer packets serially descriptive of samples of a line of image scan into charge funnel 13 and CCD shift register 14. Charge funnel 13 and CCD register 14 are continuously forward clocked throughout field trace, in synchronism with the selected charge transfer channel(s) in image register 10 and its extension 11 and for a time thereafter to complete the advance of charge packets through their cascade connection. The charge funnel 13 is a CCD charge transfer channel wide enough at its input port to connect across the parallelly aligned output ports of the charge transfer channels in parallel array in image register 10 and its extension 11. Charge funnel 13 narrows from its input port to its output port to restore in-channel voltage response to input charge levels which are easily detectable by electrometer 12. CCD shift register 14 introduces a delay into the charge packets supplied to electrometer 14. This is done so that transients associated with the selective application of dynamic forward clocking to the charge transfer channels in image register 10 and its extension 11, which are electrostatically coupled to the input port of electrometer 14 through shared capacitance to the imager substrate, do not introduce voltage perturbations in electrometer 14 voltage response during line trace times.

CCD imager 2 differs from those known to the inventor in that CCD imager 2 includes an extension 11 of image register 10 shielded from irradiation. Extension 11 is used to store samples of transfer smear accumulated after line transfer in one field until line transfer in the next field. The reason for this storage is that it is a step in the suppression of transfer smear in static images, as can be better understood by digressing briefly to explain the nature of transfer smear in CCD imagers of line transfer type.

FIG. 2(a) shows the charge pattern stored in image register 10 before the generation of transfer smear, assuming a black field with one high-brightness spot causing accumulation of charge in one image element (or pixel) location 21 of image register 10. As the charge transfer channel containing pixel location 21 transfers its contents from left to right, the black level pixels in the pixel locations to the right of pixel location 21 transfer out of image register 10 and its extension, through charge funnel 13 and CCD shift register 14, to electrometer 14 without being affected by the high-brightness spot at pixel location 21. So on the television screen 22 shown in FIG. 2(b) video signal to the left of point 23, corresponding in display space with pixel location 21 in image register 10 space, is at black level.

As charge packets accumulated in pixel locations to the left of pixel location 21 in image register 10 are clocked past pixel location 21, the high brightness spot is photoconverted to add incremented charge to these charge packets, creating white-going transfer smear. In the present instance where the charge packets accumulated during the previous field consist of only relatively small integrated dark current, because the image field is black, transfer smear becomes the primary component of these charge packets transferred past pixel location 21. The transfer smear shows up in television screen 22 of FIG. 2(b) as a white-going horizontal line transfer smear artifact 24 extending rightward from point 23 in the first field displayed after the bright spot appears at pixel location 21.

After the last charge packet sampling dark current only originating at the leftmost edge of image register 10 is clocked past pixel location 21, it is necessary to continue the clocking of the selected charge transfer channel(s) in image register 10 and its extension 11 sufficiently long to move that charge packet to the input port of charge funnel 13. A succession of empty-well charge packets (in effect from off image register 10 to its left) are clocked past pixel location 21, and the high-brightness spot admixes transfer smear with them.

FIG. 3(a) shows the charge pattern stored in image register 10 prior to the dynamic clocking of the charge transfer channel containing pixel location 21 during the next field. The charge packets sampling empty wells in the previous field with which transfer smear had been admixed have accumulated an integrated dark current component as well and appear as remnant transfer smear samples in the pixel locations along line 25 in that charge transfer channel. Remnant transfer smear samples also appear in the portion of that charge transfer channel in extension 11, which is important to remember when consideration of FIG. 1 apparatus resumes. Since extension 11 is shielded from irradiation the remnant transfer smear samples therein are transfer-smear-only samples, without image sample content. Except for being incremented by dark current accumulated over the intervening field, these remnant transfer-smear-only samples are still available in extension 11 a field later in time.

FIG. 3(b) shows how the white-going transfer smear artifacts appear on the television screen 22 in this second field and subsequent fields if the high-brightness spot location does not change. As the charge packets stored in portion 25 of the selected charge transfer channel are read out to electrometer 12 at the beginning of the line trace, electrometer 12 responds to generate the white-going horizontal line artifact 26 extending to point 23 on screen 22. Thereafter, during the completion of line trace, white-going horizontal line artifact 24' is generated analogously with horizontal line artifact 24 in the preceding field.

By applying the principle of superposition, the generation of transfer smear for any more complex image can be analyzed. The shielding of extension 11 of image register 10 from irradiation means that charge packets sampling transfer smear stored in extension 11 will not be incremented by image-generated charge in such superposition process. When the image generating transfer smear does not change from field to field, the transfer smear samples provided by charge packets stored in extension 11 can be viewed as representative of transfer smear for the whole line of charge packets with image content which follow them in their respective charge transfer channels, as may be discerned from consideration of FIG. 3(b) and the principle of superposition.

In FIG. 1 the output signal samples from CCD imager 2 are digitized by an analog-to-digital converter 17. A multiplexer 18 selects, during the line retrace interval, the digitized transfer-smear-only response of electrometer 12 to a charge packet clocked out of the extension 11 prior to the charge packets originating in the portion of the charge transfer channel in image register 10. The selected digitized transfer-smear-only sample is stored for the ensuing line trace interval in a digital latch 19. Multiplexer 18 directs the digitized image samples contaminated with transfer smear that continue to be read out from image register 10 during that ensuing line trace interval to the minuend input port of a subtractor 20. The transfer-smear-only sample stored in latch 19 is applied to the subtrahend input port of subtractor 20 throughout this ensuing line trace interval. Latch 19 is reset at the end of this ensuing line trace interval. The output port of subtractor 20 supplies digitized video samples in which transfer smear is suppressed, particularly for images which do not change from field to field.

FIG. 4 shows a variant of the FIG. 1 apparatus in which CCD imager 2 output signal samples are not digitized by an analog-to-digital converter prior to transfer smear suppression. A dc restoration circuit 27 is connected in cascade after imager 2. At the outset of each line scan, circuit 27 clamps the output signal to reference black level during the portion of line retrace interval that imager 2 supplies transfer-smear-only output signal samples. This suppresses transfer smear in the ensuing line trace interval.

FIG. 5 shows a variant of the FIG. 1 apparatus which employs a CCD imager 3, the image register 10 of which need not have an extension 11 shielded from irradiation. The empty-well plus transfer smear samples, which in each line scan follow a line trace of video samples contaminated with transfer smear, are not retained for a field time in an extension 11 of image register 10, but instead are read out of CCD imager 3. A multiplexer 28 selects a digitized transfer-smear-only sample following line trace and loads it into latch 29, after having applied the preceding line of video samples not contaminated with transfer smear to the input port of a one-horizontal-line (1H) digital delay network 30. The output port of 1H delay network 30 connects to the minuend input port of subtractor 20, and latch 29 content is applied to the subtrahend input port of subtractor 20, The transfer-smear-only samples following line trace in CCD imager 3 output signal, as digitized by analog-to-digital converter 17, precede line trace in the delayed digitized CCD imager 3 sampled output signal as appears at the output part of 1H delay network 30. So latch 19 content subtracted from these delayed digitized CCD imager 3 sampled output signal suppresses their accompanying transfer smear content in subtractor 20 output response.

Apparatus for suppressing transfer smear similar to that shown in FIG. 5 (or 8) may be used with a CCD imager similar to 3 but with an image register extension shielded from irradiation and located at the end of image register 10 remote from charge funnel 13, in another variant of the invention.

The problems of suppressing transfer smear are more complicated when the image irradiating image register 10 changes from field to field because of movement of objects in the scene being televised or to movement of the camera relative to the scene being televised. This will be apparent where transfer smear suppression is afforded only to images that are unchanging from field to field. Certain transfer smear problems, those which occur when panning a CCD camera in a direction perpendicular to that in which the charge transfer channels in the image register of the CCD imager are oriented, are more objectionable than certain other transfer smear problems, those which occur when panning the CCD camera in the direction in which the charge transfer channels are oriented. Television cameras pan in horizontal directions more than they do in vertical directions. This makes the use of a line transfer type of CCD imager, wherein the charge transfer channels are horizontally disposed in the image register, advantageous over the use of a field transfer type of CCD imager, wherein the charge transfer channels are vertically disposed in the image register, supposing one is not to specifically to provide suppression of transfer smear for images which change from field to field. However, consider now how suppression of transfer smear for images which change from field to field can be provided in connection with CCD images of line transfer type.

FIG. 6(a) is useful in understanding how the problem of transfer smear is complicated by vertical movement of the high-brightness spot described in connection with FIGS. 2 and 3 to a new pixel location 31 in image register 10. This type of movement occurs during vertical panning of the television camera with CCD imager 2 or 3, for example. The remnant transfer smear 25 from the previous line transfer remains at the locations to the right of the old position 21 of the high-brightness spot.

FIG. 6(b) shows the presentation in television display screen 22 where points 23 and 33 spatially correspond to the former and present locations respectively of the high-brightness spot in the otherwise black field of the image. A white-going line artifact of transfer smear 34 appears to the right of point 33 for the same reasons a similar line artifact 24 extended to the right of point 23 in FIG. 2(b). The remnant transfer smear 25 causes a white-going line artifact 26 extending from leftward of display screen 22 to point 23 to appear during this field—i.e., to appear with a one-field lag time. On subsequent fields presuming the high-brightness spot does not move from pixel location 31 a horizontal white-going line artifact attributable to transfer smear will cross the entire screen 22, passing through point 33. Where vertical panning continues, one will appreciate from superposition considerations that a vertical smudging will appear in a televised scene containing high-brightness elements.

FIG. 7(a) is useful in understanding how the problem of transfer smear is complicated by horizontal movement of the high-brightness spot from pixel location 21 in image register 10 to a new pixel location 41. As seen on screen 22 in FIG. 7(b) in the field just after this movement the transfer smear white-going line artifact 26 from the previous field is disjoined from a white going line artifact 44 extending rightward from point 43 spatially corresponding to point 41. Horizontal panning in the other direction will cause the more current transfer smear line artifact to overlap the remnant transfer smear line artifact, rather than the two transfer smear line artifacts being broken apart.

FIG. 8 shows line-transfer CCD imager 3 in combination with transfer smear suppression apparatus that deals individually with, on the one hand, relatively current transfer smear components transferred out of imager 3 during the line transfer in which they are accumulated and, on the other hand, remnant transfer smear components transferred out of imager 3 during the line transfer one field after the line transfer in which they are generated. The transfer-smear-only sample for each line, as separated out by multiplexer 28 after line trace interval, is applied to the input port of a multi-bit per stage digital shift register 50 clocked at line advance rate. The initial storage stage of shift register 50 stores the digitized transfer-smear-only sample for the line most recently traced, and the final storage stage of shift register 50 stores the digitized transfer-smear-only sample for the corresponding line in the preceding frame. The stages between store the respective transfer-smear-only samples of the intervening scan lines.

A threshold detector 51 detects the presence of white-going excursions indicative of high-brightness spots that might give rise to transfer smear, the detection being done on the digitized video samples contaminated by transfer smear and delayed by one scan line in 1H delay network 30. After the presence of such spot is detected, the most current transfer-smear-only sample from the initial stage of shift register 50 will be passed by a gate 52 to an input port of an adder 53. Until the presence of such spot is detected, gate 52 applies zero to this input part of adder 53. (Gate 52 may be constructed using tri-state devices, for example.) The output port of adder 53 connects to the subtrahend input port of subtractor 20. So, after the time a high-brightness spot is detected in the delayed scan line the transfer-smear-only sample generated during the same line transfer as that scan line was generated is subtracted from the video signal samples contaminated with transfer smear. This suppresses line artifacts of transfer smear such as 24, 24', 34 and 44.

FIG. 8 shows the operation just described being achieved as follows. A reset-set flip-flop 55 is reset during each line retrace to place Q output at logic ZERO and $\bar{Q}$ output at logic ONE. Q output from flip-flop 55 is applied to one input port of an OR-gate 54. The other input port of OR-gate 54 is connected from the output port of threshold detector 51, which supplies a logic ZERO until a high-brightness spot is detected to cause threshold detector 51 to supply a logic ONE instead. The output port of OR-gate 54 applies SET signal to flip-flop 55 to raise its Q output to logic ONE, which maintains OR-gate 54 output at logic ONE until flip-flop 55 is reset during line retrace. The output signal of OR-gate 54 is the control signal for gate 52. Logic ONE control signal causes gate 52 to forward the contents of the initial stage of shift register 50 to adder 53 and logic ZERO control signal causes gate 52 to forward arithmetic zero to adder 53 instead.

The transition of flip-flop 55 Q output from logic ZERO to logic ONE is detected by a differentiator circuit 56 comprising a unit pixel delay 57, a logic inverter 58, and an AND gate 59. The location of this transition is stored for a frame time in a bright-pixel memory 60. Memory 60 may be a bit-map memory, for example, addressed with a scan line counter and a pixel counter counting the pixel scan through each line, with a one line per frame offset in addressing to avoid overwrite during horizontal movement of image high-brightness spot respective to image register 10. Or memory 60 may store the pixel address of a high-brightness spot in any scan line, which is preferable from the standpoint of compactness of memory.

Consider now how the information stored in bright pixel memory 60 the frame before and read out during delayed scan line output of 1H delay network 30 as currently supplied. During the time in the delayed scan line from 1H delay network 30 output port that memory 60 indicates there to have been a high-brightness spot one frame earlier, a logic ONE is supplied from memory 60 to set the $\bar{Q}$ output of a reset-set flip-flop 61 to logic ZERO. A selective transmission gate 62 receptive of flip-flop 61 $\bar{Q}$ output as control signal is then operative to forward a zero to an input of adder 53 for the remainder of the scan line responsive to flip-flop 61 $\bar{Q}$ output being logic ZERO. Flip-flop 61 $\bar{Q}$ output having been reset to logic ONE at the outset of each scan line, conditions gate 52 until this time to forward the contents of the final stage of shift register 50 to the adder 53 output, subsequently to be supplied to the subtrahend input of subtractor 20 as a transfer-smear-only sample. In subtractor 20 this transfer-smear-only sample is subtracted from the video sample contaminated with transfer smear supplied to the minuend input port of subtractor 20 from delay network 30.

A number of variants of the circuits just described will readily occur to one skilled in the art and acquainted with the foregoing disclosure; this should be borne in mind when construing the scope of the following claims. As one example, the trace-retrace multiplexer 18 or 28 may select more than one transfer-smear-only sample per line retrace time and their values may then be averaged for application to the subtrahend input part of subtractor 20. Variants of the FIG. 8 apparatus can be designed to better accommodate wide high-brightness areas or more than one high brightness spot per line, as further examples. As a still further example, replacing CCD imager 3 in FIG. 8 with a CCD imager having an image register extension, a pair of line-rate-clocked latches can replace multiplexer 28 and line-rate-clocked shift register 50.

I claim:
1. In combination:
   a CCD imager of line transfer type for supplying samples of video signal contaminated with transfer smear and for supplying samples of transfer smear alone; and
   means differentially combining samples of video signal contaminated with transfer smear with samples of transfer smear alone for generating video signal samples in which transfer smear contamination is substantially suppressed.

2. A television camera in which video signal with suppressed transfer smear is generated in digital sampled-data form, said television camera comprising:
   a CCD imager of line transfer type having an image register wherein each of the charge transfer channels therein is shielded from irradiation over a portion of its length near the output port thereof, said charge transfer channels being selectively forward clocked so charge packets accumulated in the shielded portions thereof are transferred out of said image register during line retrace intervals and charge packets accumulated in the remaining portions thereof responsive to elements of a radiant image are transferred out of said image register during line trace intervals;

an analog-to-digital converter, having an input part to which the CCD imager output samples are supplied in analog sample form, and having an output port from which digitized responses to said analog samples are supplied;

a multiplexer for separating digitized output signal samples supplied from said analog-to-digital converter during line trace intervals from those supplied during line retrace intervals;

a memory for storing the level of digitized output signal samples during line retrace intervals for the duration of the following line trace interval; and a subtractor subtracting said stored level from said digitized output signal samples during said following line trace interval for generating, in digital sampled-data form, said video signal with suppressed transfer smear.

3. A television camera in which video signal with suppressed transfer smear is generated in digital sampled-data form, said television camera comprising:

a CCD imager of line transfer type having an image register wherein each of the charge transfer channels therein is shielded from irradiation over a portion of its length near the output port thereof, said charge transfer channels being selectively forward clocked so charge packets accumulated in the shielded portions thereof are transferred out of said image register during line retrace intervals and charge packets accumulated in the remaining portions thereof responsive to elements of a radiant image are transferred out of said image register during line trace intervals; and a d-c restorer restoring dc level in the video signal based on CCD imager output signal samples, the clamping being to a dc level related to the dc level of at least one of said CCD imager output signal samples supplied during line retrace intervals.

4. A television camera in which video signal with suppressed transfer smear is generated in sampled form, said television camera comprising:

a CCD imager of line transfer type having an image register wherein each of the charge transfer channels therein is selectively forward clocked during a respective line trace interval to transfer out charge packets accumulated therein responsive to elements of a radiant energy image and during at least a portion of the subsequent line retrace interval to transfer out charge packets descriptive of transfer smear;

means for delaying the CCD imager output signal samples occuring during line trace intervals for substantially one full line time;

means for storing for a line time the value of transfer smear in CCD output signal samples supplied during line retrace time, which are descriptive of transfer smear; and means subtracting the remembered value supplied during line retrace time from the delayed CCD imager output signal samples, for generating in sampled form said video signal with suppressed transfer smear.

5. A television camera as set forth in claim 4 having:

an analog-to-digital converter having an input port connected to the output port of said CCD imager and having an output port for supplying digitized CCD imager output signal in sampled-data form;

a trace-retrace multiplexer for separating the line-trace-interval samples of said digitized CCD imager output signal from the line-retrace-interval samples;

a digital delay line having an input port to which the line-trace-interval samples of said digitized CCD imager output signal are applied, having an output port, and being included within said means for delaying the CCD imager output signal samples occurring during line trace intervals;

digital latch means for storing the level of line-retrace-interval portions of said digitized CCD imager output signal for said substantially one full line time, included in said means for storing the value of transfer smear in CCD output signal samples supplied during line retrace time; and a subtractor having one input port connected to the output port of said digital delay line and another input port for receiving the level stored in said digital latch means, included within said means for generating in sampled form said video signal with suppressed transfer smear.

6. A television camera in which video signal with suppressed transfer smear is generated in sampled form, comprising:

a CCD imager of line transfer type having an image register wherein each of the charge transfer channels therein is selectively forward clocked during a respective line trace interval to transfer out charge packets accumulated therein responsive to elements of a radiant energy image and during at least a portion of the subsequent line retrace interval to transfer out charge packets descriptive of transfer smear;

means for delaying the CCD imager output signal samples occurring during line trace intervals for substantially one full line time;

means for storing, both for a line time and for a frame time plus a line time, the value of transfer smear in CCD output signal samples supplied during each line retrace time, which are descriptive of transfer smear;

means for detecting high-brightness spots in the delayed CCD imager output signal samples;

bright pixel memory means for storing for a frame time the positions along each scan line at which high-brightness spots were detected;

means for subtracting from said delayed CCD imager output signal samples, during each line trace time up until said bright pixel memory mean indicates a high-brightness spot was detected a frame earlier, the value of transfer smear remembered for a frame time plus a line time; and means for subtracting from said CCD imager output signal samples, during the portion of each line trace time after a high-brightness spot is detected, the value of transfer smear remembered for a line time.

* * * * *